United States Patent
Wu et al.

(10) Patent No.: US 7,844,950 B2
(45) Date of Patent: Nov. 30, 2010

(54) SYSTEM FOR DIAGNOSING AND TESTING COMPUTERS

(75) Inventors: Jian Wu, Shenzhen (CN); Li-Ping Chen, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1190 days.

(21) Appl. No.: 11/309,150

(22) Filed: Jun. 28, 2006

(65) Prior Publication Data

US 2007/0220487 A1  Sep. 20, 2007

(30) Foreign Application Priority Data

Mar. 17, 2006  (CN) .......................... 2006 1 0034552

(51) Int. Cl.
  *G06F 9/44* (2006.01)
(52) U.S. Cl. .................. 717/124; 717/125; 717/126; 717/105; 717/109; 717/117; 714/38; 715/700
(58) Field of Classification Search ......... 717/124–126, 717/105, 109; 714/38
  See application file for complete search history.

(56) References Cited

U.S. PATENT DOCUMENTS

| | | | | | |
|---|---|---|---|---|---|
| 4,445,177 | A | * | 4/1984 | Bratt et al. | 712/245 |
| 4,525,780 | A | * | 6/1985 | Bratt et al. | 711/163 |
| 4,942,541 | A | * | 7/1990 | Hoel et al. | 358/1.16 |
| 5,390,131 | A | * | 2/1995 | Rohrbaugh et al. | 716/4 |
| 5,892,949 | A | * | 4/1999 | Noble | 717/125 |
| 5,987,617 | A | * | 11/1999 | Hu et al. | 713/320 |
| 6,047,389 | A | * | 4/2000 | Thai | 714/38 |
| 6,061,517 | A | * | 5/2000 | House et al. | 717/115 |
| 6,112,020 | A | * | 8/2000 | Wright | 716/17 |
| 6,182,056 | B1 | * | 1/2001 | St. Jacques et al. | 706/11 |
| 6,266,666 | B1 | * | 7/2001 | Ireland et al. | 707/770 |
| 6,859,922 | B1 | * | 2/2005 | Baker et al. | 717/125 |
| 6,862,711 | B1 | * | 3/2005 | Bahrs et al. | 715/205 |
| 6,880,086 | B2 | * | 4/2005 | Kidder et al. | 713/191 |
| 6,907,546 | B1 | * | 6/2005 | Haswell et al. | 714/38 |
| 7,490,319 | B2 | * | 2/2009 | Blackwell et al. | 717/124 |
| 2004/0268298 | A1 | * | 12/2004 | Miller et al. | 717/106 |
| 2005/0172267 | A1 | * | 8/2005 | Bergin | 717/124 |
| 2005/0193269 | A1 | * | 9/2005 | Haswell et al. | 714/38 |

OTHER PUBLICATIONS

Title: Data-flow-based unit testing of aspect-oriented programs, author: Jianjun Zhao, dated: Nov. 6, 2003, source: IEEE.*
Title: Standard Automatic Test System (SATS) Hardware Interface Standards, author: Michael J. Stora, dated: Source: IEEE.*

* cited by examiner

*Primary Examiner*—Chameli C Das
(74) *Attorney, Agent, or Firm*—Wei Te Chung

(57) ABSTRACT

A system for diagnosing and testing computers includes a graphical user interface tier, an invoking logic tier, and a test logic tier. The graphical user interface tier offers users a graphical user interface to show the progress and results of testing hardware components and generating diagnosis configuration files in accordance with a selected computer hardware component as needed; the invoking logic tier invokes the test logic tier in accordance with the diagnosis configuration files; and the test logic tier includes a test items module, the test items module includes a plurality of sub-modules which run to test different computer hardware components after invoked by the invoking logic tier.

16 Claims, 3 Drawing Sheets

| Graphical User Interface Tier | Interface Of Editing Test Scheme | Interface Of Configuring parameters | Interface Of Excuting Test Scheme |
|---|---|---|---|
| | Interface Of Application | | |
| Dynamic Link Library Of Test Logic Tier | Modules Of Dynamic Link Library | | |

FIG. 1
(PRIOR ART)

SYSTEM FOR DIAGNOSING AND TESTING COMPUTERS

This application claims foreign priority based on an application 200610034552.X filed in China on Mar. 17, 2006.

FIELD OF THE INVENTION

The present invention relates to a diagnosing and testing system, and more particularly to a diagnosing and testing system for computers.

DESCRIPTION OF RELATED ART

Computer manufacturers usually use automatic diagnosing and testing systems in order to test the computer products more efficiently and reliably. A typical system for diagnosing and testing computers uses two-tier-architecture (referring to FIG. 1). A first tier is a test logic tier including a plurality of dynamic link libraries. A second tier is a graphical user interface tier. Each dynamic link library of the first tier is used to test a corresponding computer hardware component such as a central processing unit, a memory, and hard disks etc. The second tier offers users a graphical user interface and invokes the dynamic link libraries of the first tier to test the hardware components. The second tier further includes interfaces for editing test scheme, configuring parameters, and executing test scheme.

However, in the above-described diagnosing and testing system, test logic is distributed into different dynamic link libraries for test an individual hardware component. Thus, it is difficult to debug the system because it is hard to discern which tier has errors when the diagnosing system runs improperly. In order to both offer users graphical interfaces and invoke the dynamic link libraries of the first tier, the algorithms of the graphical user interface tier are complex. It is difficult to develop and maintain the graphical user interface tier. If users need to replace the interface of the graphical user interface tier, for example, replacing a c++ interface with a JSP interface, there are few codes of the second tier are reusable.

What is needed, therefore, is a diagnosing and testing system that can be easily maintained, developed, and debugged.

SUMMARY OF THE INVENTION

A system for diagnosing and testing computers is used to test hardware of computers automatically. The diagnosing and testing system uses three-tier-architecture and includes a graphical user interface tier, an invoking logic tier, and a test logic tier. The graphical user interface tier offers users a graphical user interface to show the progress and results of testing hardware components and generating diagnosis configuration files in accordance with a selected computer hardware component as needed; the invoking logic tier invokes the test logic tier in accordance with the diagnosis configuration files; and the test logic tier includes a test items module, the test items module includes a plurality of sub-modules which run to test different computer hardware components after invoked by the invoking logic tier.

Other advantages and novel features will be drawn from the following detailed description of preferred embodiments with the attached drawings, in which:

BRIEF DESCRIPTION OF THE DRAWINGS

FIG. 1 is a diagram of a conventional diagnosing and testing system;

DETAILED DESCRIPTION OF THE INVENTION

Figure 2:
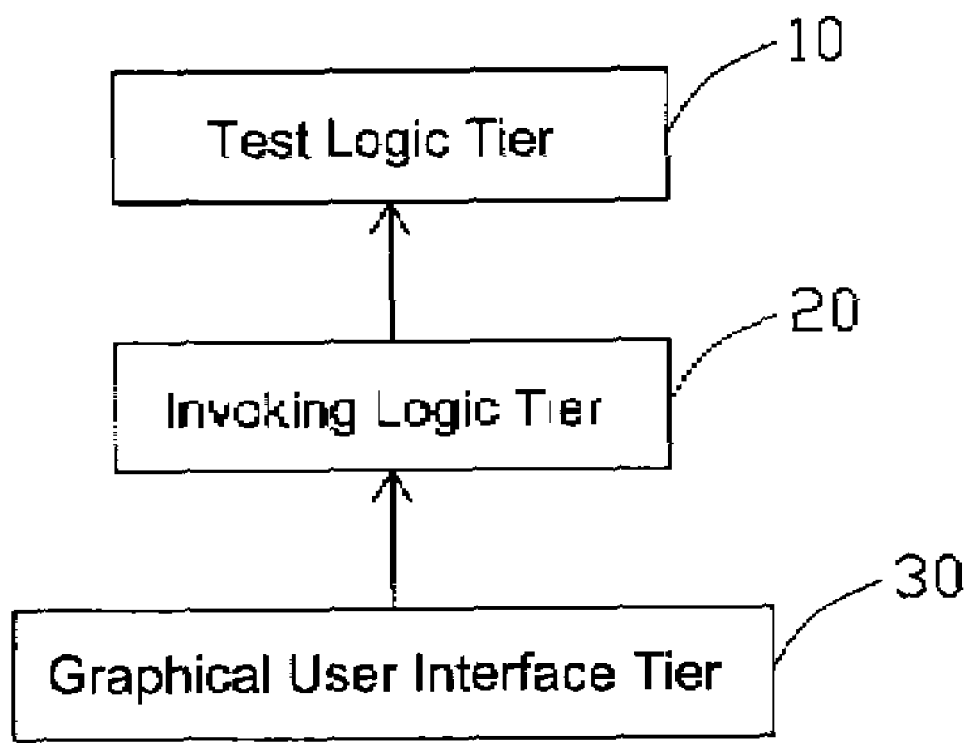
FIG. 2 is a diagram of a diagnosing and testing system in accordance with a preferred embodiment of the present invention.

Referring to FIG. 2, a diagnosing and testing system in accordance with a preferred embodiment of the present invention includes a test logic tier 10, an invoking logic tier 20, and a graphical user interface (GUI) tier 30.

Figure 3:
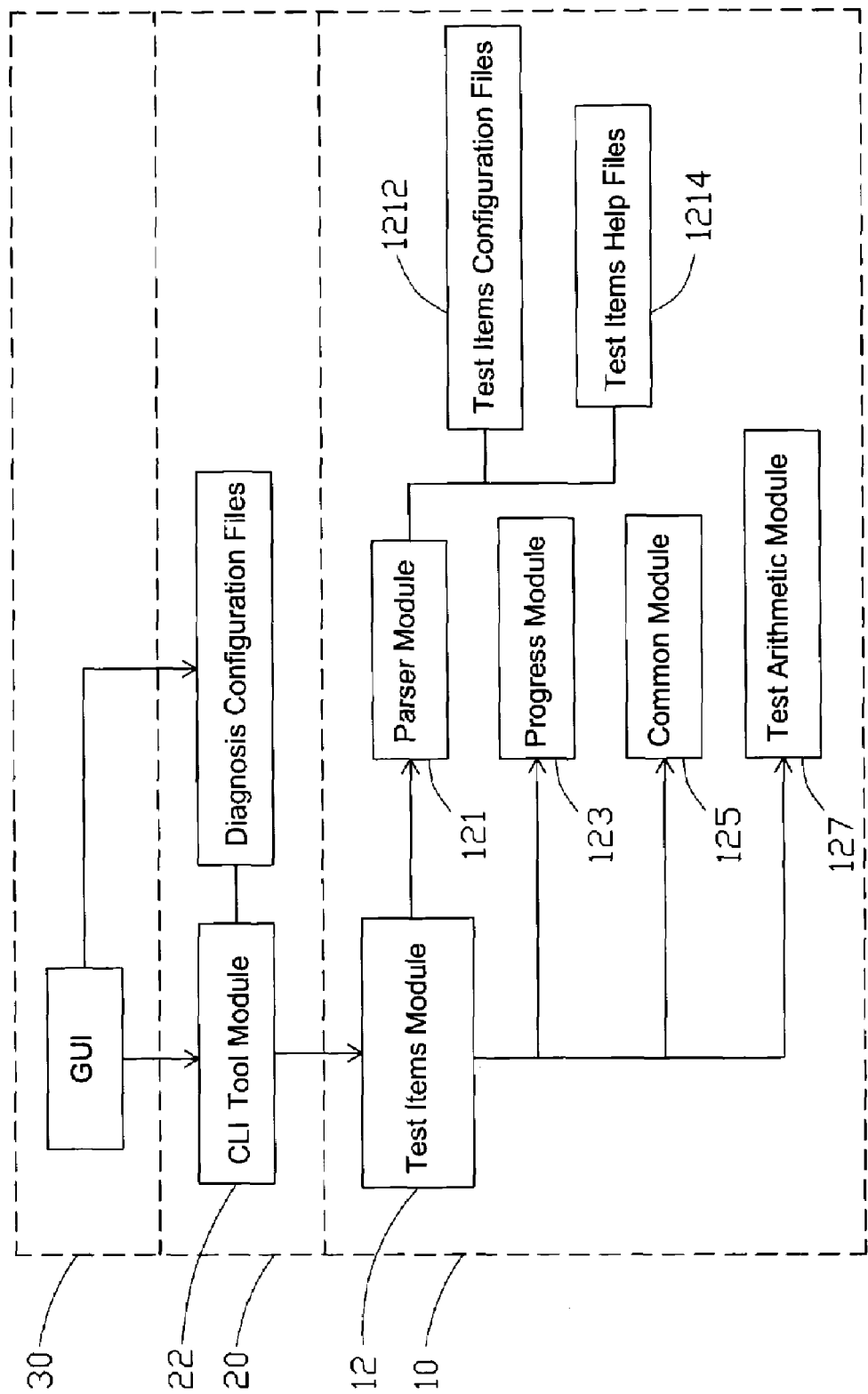
FIG. 3 is a detailed diagram of the diagnosing and testing system of FIG. 2.

Referring to FIG. 3, the testing logic tier 10 includes a test items module 12. The test items module 12 includes a plurality of sub-modules corresponding to different hardware components to be tested such as a keyboard, a mouse, a memory, a hard disk, a super input/output, a central processing unit (CPU), a floppy disk, a mainboard, a network interface card, a video card, an audio card, and etc. The test logic tier 10 further includes a parser module 121, a progress module 123, a common module 125, and a test arithmetic module 127, all of which can be invoked by the test items module 12. Before invoking the parser module 121, the progress module 123, the common module 125, and the test arithmetic module 127, each sub-module of the test items module 12 is a blank logic module, which occupies virtual memory. The parser module 121 is used to parse test item configuration files 1212 and test item help files 1214, both of which include parameters for testing the hardware components. The parser module 121 is a dynamic link library developed using extensible markup language (.XML). The progress module 123 is a dynamic link library, which records test progress and error logs, debug logs, and test logs. The common module 125 is also a dynamic link library, which contains common test parts of the sub-modules. For example, if all of the hardware components have a common interface, then a test application of the common interface is contained in the common module 125. The test arithmetic module 127 includes a plurality of testing algorithm sub-modules corresponding to different hardware components. Each sub-module of the test items module 12 can invoke a relevant testing algorithm sub-module of the test arithmetic module 127.

The invoking logic tier 20 includes a command line interface (CLI) tool module 22. The CLI tool module 22 is used to invoke a corresponding sub-module of the test items module 12.

The GUI tier 30 shows a plurality of icons of the components to be tested such as Keyboard, Mouse, Memory, Hard disk, Super I/O, CPU, mainboard, video card, and etc for operators to choose which item to test. After an icon is chosen the GUI tier 30 generates diagnosis configuration files and sends the files to the invoking logic tier 20. The CLI tool module 22 of the invoking logic tier 20 invokes a corresponding sub-module of the test items module 12 in accordance with diagnosis configuration files. The GUI tier 30 also displays testing progress and test results. The GUI tier 30 is separated from the test logic tier 10 and the invoking logic tier 20, and can be developed using different programming languages such as C++, JSP, HTML, JAVA, etc. The test algorithms are simpler and thus, it is easy for second development of this GUI tier 30.

For example, an operator selects a CPU icon to test a CPU of a computer. The GUI tier 30 generates the diagnosis configuration files corresponding to the CPU and sends the files to the invoking tier 20. The CLI tool module 22 of the invoking tier 20 invokes the CPU sub-module in the test items module 12. The CPU sub-module invokes the parser module 121, the progress module 123, the common module 125, and a test algorithm sub-module of the test arithmetic module 127 for testing CPUs. The parser module 121 parses the test items configuration files 1212 and the test items help files 1214. The test items configuration files 1212 and the test items help files 1214 parsed by the parser module 121 include parameters for testing the CPU. The progress module 123 generates test progress, error logs, debug logs, and test logs for the GUI 30 to display. After invoking the parser module 121, the progress module 123, the common module 125, and the test arithmetic module 127, the CPU sub-module is running and the test progress and test result of the CPU will be shown on the screen and written into logs.

While the present invention has been illustrated by the description of preferred embodiments thereof, and the preferred embodiments have been described in considerable detail, it is not intended to restrict or in any way limit the scope of the appended claims to details. Additional advantages and modifications within the spirit and scope of the present invention will readily appear to those skilled in the art. The present invention is not limited to the specific details and illustrative examples described.

What is claimed is:

1. A system for diagnosing and testing computers, comprising:
    a graphical user interface tier, offering users a graphical user interface to show the progress and results of testing hardware components and generating diagnosis configuration files in accordance with a selected computer hardware component as needed;
    a test logic tier, the test logic tier comprising a test items module, the test items module comprising a plurality of sub-modules which run to test different computer hardware components respectively; and
    an invoking logic tier, for invoking the sub-modules of the test logic tier in accordance with the diagnosis configuration files generated by the graphical user interface tier; and the test logic tier further comprises a parser module, a progress module, a common module, and a test arithmetic module, which can be invoked by each of the plurality of sub-modules;
    wherein each of the plurality of sub-modules is a blank logic module which occupies virtual memory before invoking the parser module, the progress module, the common module, and the test arithmetic module.

2. The system as described in claim 1, wherein the test logic tier further comprises test items configuration files and test items help files that can be parsed by the parser module, the test items configuration files and the test items help files comprise parameters for testing the hardware components.

3. The system of diagnosing and testing computers as described in claim 1, wherein one of the plurality of sub-modules is configured to test a central processing unit.

4. The system as described in claim 1, wherein the progress module is a dynamic link library which records test progress and logs.

5. The system as described in claim 1, wherein the common module is a dynamic link library, which contains test portions common to all the sub-modules of the test logic tier.

6. The system as described in claim 1, wherein the invoking logic tier includes a command line interface tool module for invoking the sub-modules of the test logic tier in accordance with the configuration files.

7. A system for diagnosing and testing computers comprising:
    a first tier, comprising a plurality of sub-modules for testing different computer hardware components correspondingly;
    a second tier, for invoking the sub-modules of the first tier; and
    a third tier offering graphical user interface to show testing progress and testing results of testing hardware components;
    wherein the third tier is separated from the first tier and second tier; the first tier further comprises a parser module, a progress module, a common module, and a test arithmetic module;
    and each of the plurality of sub-modules is a blank logic module which occupies virtual memory before invoking the parser module, the progress module, the common module, and the test arithmetic module.

8. The system as described in claim 7, wherein the test arithmetic module comprises a plurality of test algorithms sub-modules corresponding to relative computer hardware components, after invoking the parser module, the progress module, and a corresponding testing algorithm of the test arithmetic module, the sub-modules can test a corresponding hardware component.

9. The system as described in claim 8, wherein the parser module is a dynamic link library developed using extensible markup language.

10. The system as described in claim 8, wherein the first tier further comprises test items configuration files and test items help files that can be parsed by the parser module, the test items configuration files and the test items help files include parameters for testing the hardware components.

11. The system as described in claim 7, wherein the second tier comprises a command line interface tool module for invoking sub-modules for testing the hardware components of the first tier.

12. The system as described in claim 11, wherein the third tier offers a plurality of icons corresponding to the hardware components respectively and generates diagnosis configuration files in accordance with a selected icon, the command line interface tool module of the second tier invokes a sub-module of the first tier in accordance with the diagnosis configuration files.

13. The system as described in claim 7, wherein the third tier supports second development using different programming languages.

14. A system for diagnosing and testing hardware components of computers, comprising:
    a test logic tier comprising a test items module which has a plurality of sub modules for testing the hardware components respectively, test item configuration files and test items help files containing parameters corresponding to the relative hardware components, a parser module for parsing the test item configuration files and test items help files, a progress module for recording test progress and logs, a common module containing common test parts of the sub-modules, and a test arithmetic module comprising a plurality of test algorithms sub-modules corresponding to the relative computer hardware components;
    an invoking logic tier for invoking the sub-modules of the test items; and
    a graphical user interface tier for offering users a graphical user interface to show testing results of the hardware components;
    wherein each of the plurality of sub-modules is a blank logic module which occupies virtual memory before invoking the parser module, the progress module, the common module, and the test arithmetic module.

15. The system as described in claim 14, wherein the invoking logic tier includes a command line interface tool module for invoking the sub-modules for testing the hardware components of the test logic tier.

16. The system as described in claim 15, wherein the graphical user interface tier offers a plurality of icons corresponding to the hardware components respectively and generates diagnosis configuration files in accordance with a selected icon, the command line interface tool module invokes a sub-module of the first tier in accordance with the diagnosis configuration files.

* * * * *